US012626423B2

(12) United States Patent
Zhou et al.

(10) Patent No.: US 12,626,423 B2
(45) Date of Patent: May 12, 2026

(54) ONE-CLICK IMAGE EXTENSION WITH QUICK MASK ADJUSTMENT

(71) Applicant: ADOBE INC., San Jose, CA (US)

(72) Inventors: Yuqian Zhou, Bellevue, WA (US); Elya Shechtman, Seattle, WA (US); Zhe Lin, Clyde Hill, WA (US); Krishna Kumar Singh, San Jose, CA (US); Jingwan Lu, Sunnyvale, CA (US); Connelly Stuart Barnes, Seattle, WA (US); Sohrab Amirghodsi, Seattle, WA (US)

(73) Assignee: ADOBE INC., San Jose, CA (US)

( * ) Notice: Subject to any disclaimer, the term of this patent is extended or adjusted under 35 U.S.C. 154(b) by 184 days.

(21) Appl. No.: 18/610,861

(22) Filed: Mar. 20, 2024

(65) Prior Publication Data

US 2024/0331214 A1     Oct. 3, 2024

Related U.S. Application Data

(60) Provisional application No. 63/493,836, filed on Apr. 3, 2023.

(51) Int. Cl.
| | |
|---|---|
| *G06T 11/00* | (2026.01) |
| *G06T 3/4046* | (2024.01) |
| *G06T 5/30* | (2006.01) |

(52) U.S. Cl.
CPC ............ *G06T 11/00* (2013.01); *G06T 3/4046* (2013.01); *G06T 5/30* (2013.01); *G06T 2200/24* (2013.01); *G06T 2207/20084* (2013.01)

(58) Field of Classification Search
CPC ......... G06T 11/00; G06T 3/4046; G06T 5/30; G06T 2200/24; G06T 2207/20084; G06T 11/60
See application file for complete search history.

(56) References Cited

U.S. PATENT DOCUMENTS

| | | | |
|---|---|---|---|
| 2023/0290028 A1* | 9/2023 | Sienkiewicz | ........... G06T 13/00 |
| 2023/0377226 A1* | 11/2023 | Saharia | .................... G06N 3/08 |
| 2024/0311960 A1* | 9/2024 | Feng | ........................ G06T 5/77 |

* cited by examiner

*Primary Examiner* — Edward Martello
(74) *Attorney, Agent, or Firm* — F. CHAU & ASSOCIATES, LLC

(57) ABSTRACT

Systems and methods for image processing (e.g., image extension or image uncropping) using neural networks are described. One or more aspects include obtaining an image (e.g., a source image, a user provided image, etc.) having an initial aspect ratio, and identifying a target aspect ratio (e.g., via user input) that is different from the initial aspect ratio. The image may be positioned in an image frame having the target aspect ratio, where the image frame includes an image region containing the image and one or more extended regions outside the boundaries of the image. An extended image may be generated (e.g., using a generative neural network), where the extended image includes the image in the image region as well as generated image portions in the extended regions and the one or more generated image portions comprise an extension of a scene element depicted in the image.

20 Claims, 11 Drawing Sheets

Figure 3:
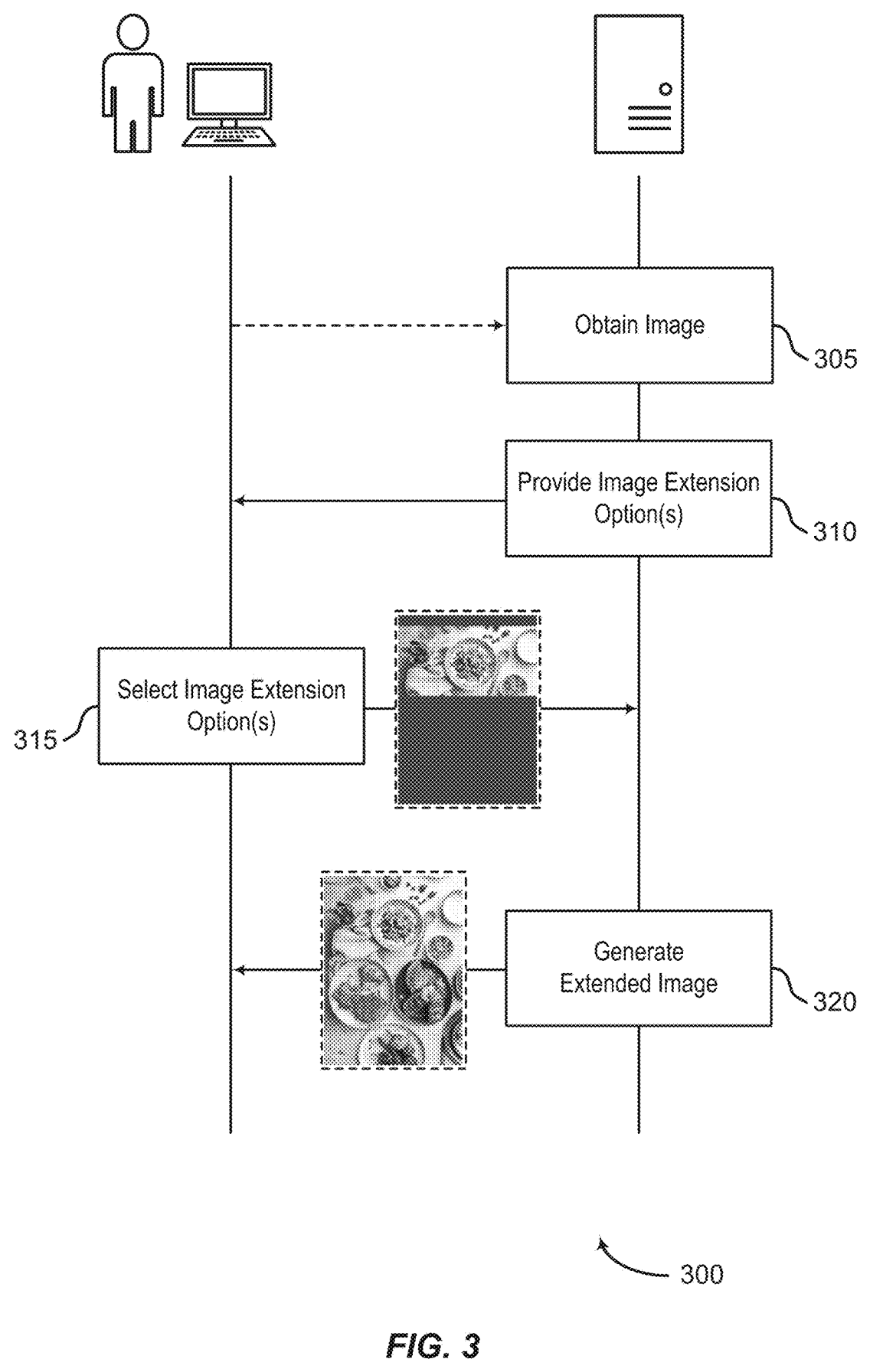

Obtain Image ~ 305

Provide Image Extension Option(s) ~ 310

Select Image Extension Option(s)

315

Generate Extended Image ~ 320

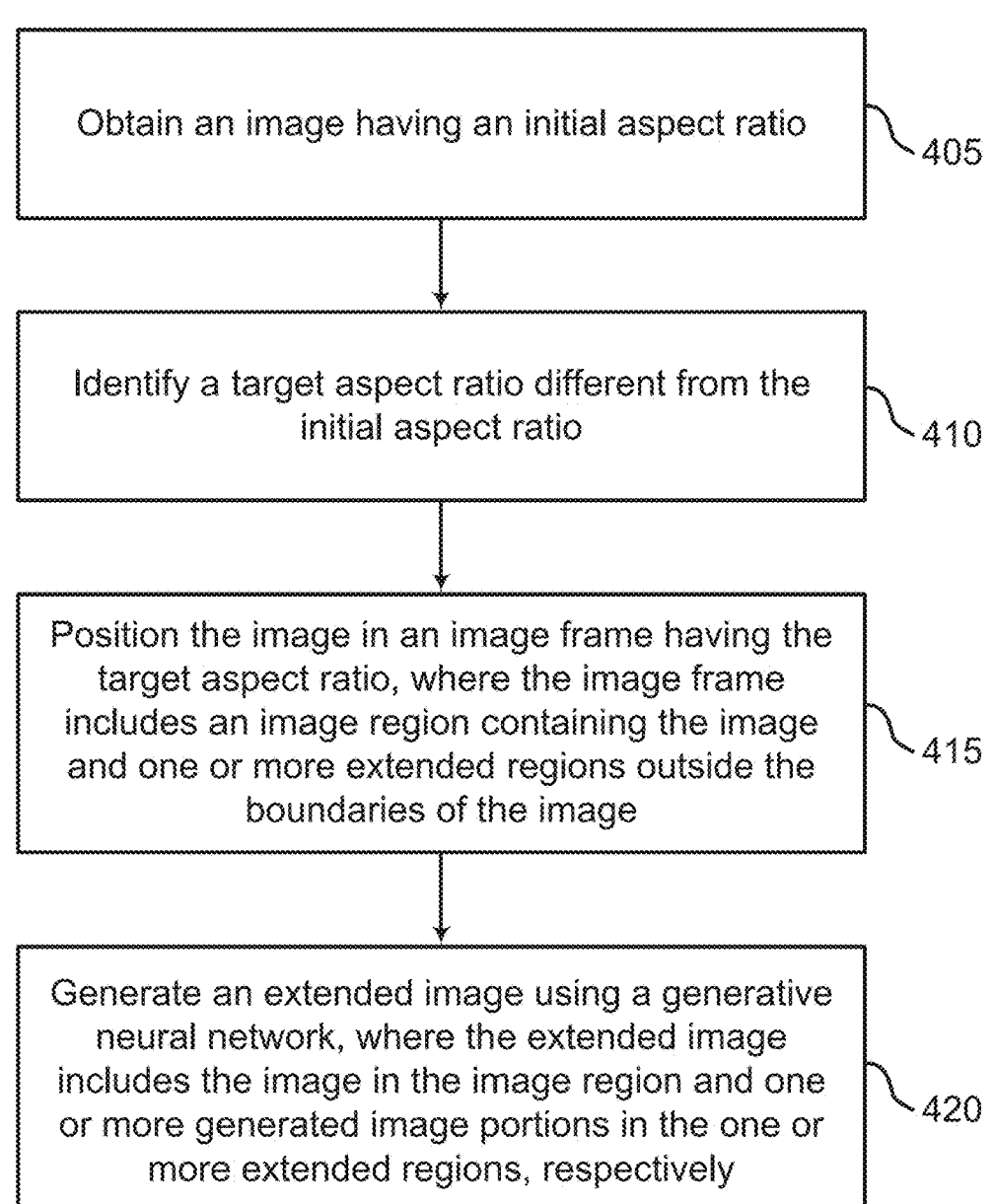

Obtain an image having an initial aspect ratio ⌐405

Identify a target aspect ratio different from the initial aspect ratio ⌐410

Position the image in an image frame having the target aspect ratio, where the image frame includes an image region containing the image and one or more extended regions outside the boundaries of the image ⌐415

Generate an extended image using a generative neural network, where the extended image includes the image in the image region and one or more generated image portions in the one or more extended regions, respectively ⌐420

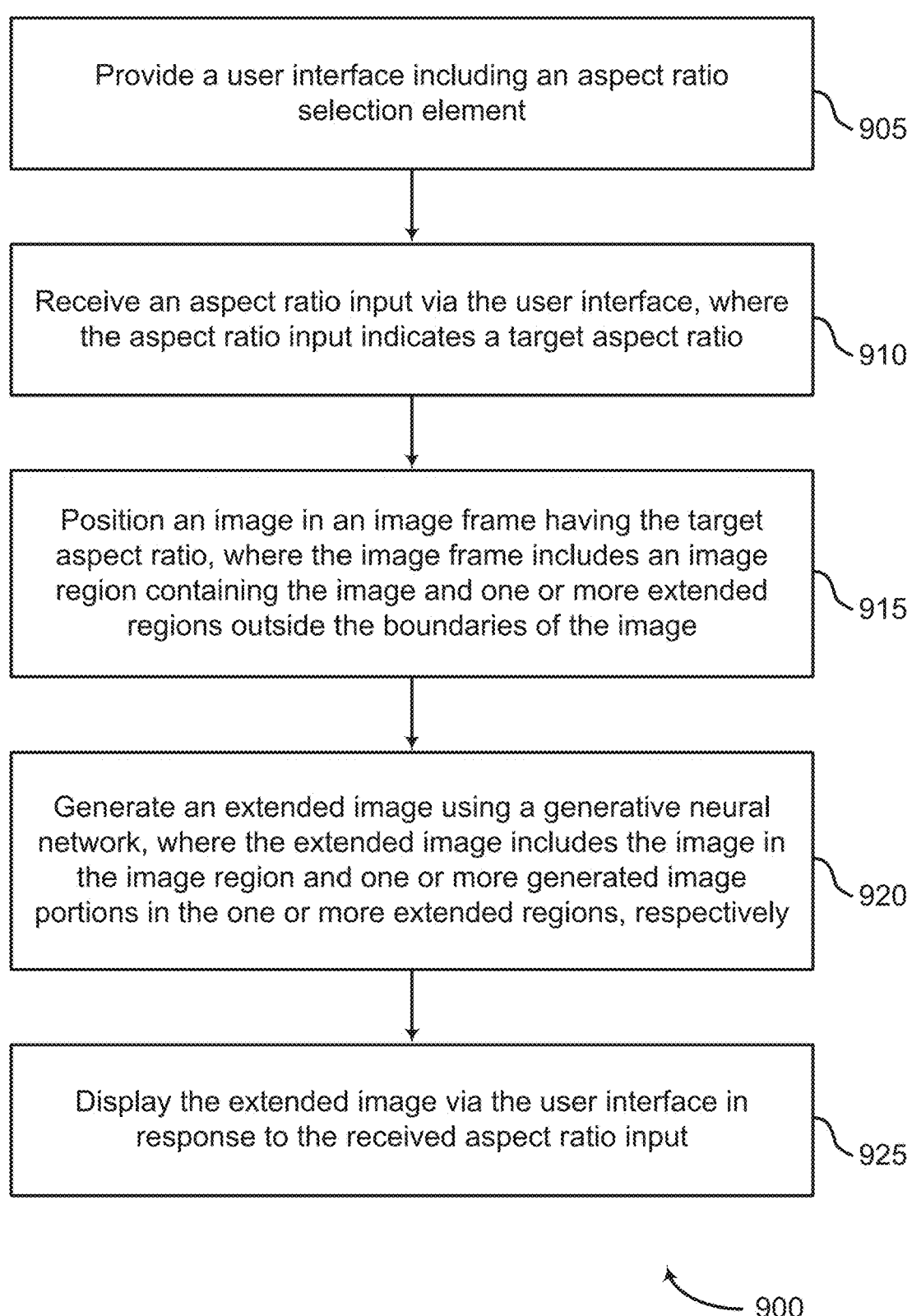

Provide a user interface including an aspect ratio selection element ⤳905

Receive an aspect ratio input via the user interface, where the aspect ratio input indicates a target aspect ratio ⤳910

Position an image in an image frame having the target aspect ratio, where the image frame includes an image region containing the image and one or more extended regions outside the boundaries of the image ⤳915

Generate an extended image using a generative neural network, where the extended image includes the image in the image region and one or more generated image portions in the one or more extended regions, respectively ⤳920

Display the extended image via the user interface in response to the received aspect ratio input ⤳925

ONE-CLICK IMAGE EXTENSION WITH QUICK MASK ADJUSTMENT

CROSS-REFERENCE TO RELATED APPLICATION

This application claims priority under 35 USC § 119(a) to U.S. Patent Application No. 63/493,836 filed on Apr. 3, 2023, the disclosure of which is incorporated by reference herein in its entirety.

BACKGROUND

The following relates generally to image processing, and more specifically to image extension using neural networks. Image processing or digital image processing refers to the use of a computer to edit a digital image (e.g., or synthesize an image) using an algorithm or a processing network. Image processing technologies have become increasingly important in various fields including photography, video processing, computer vision, and more. Image extension is a subfield of image processing. In some cases, a neural network or a machine learning model may be used to generate or modify an image. In some cases, the generated content is based on a text prompt or a source image.

SUMMARY

The present disclosure describes systems and methods for image processing. Embodiments of the present disclosure include an image processing system configured to generate an extended image (e.g., an extended representation of a user provided image based on a target aspect ratio provided by a user). For example, an image processing system may perform content editing of an image to enable customization of the image, to make the image suitable for different applications, etc. In some examples, an image processing system may automatically fill in image content around an initial (e.g., source) image to perform image extension. As described in more detail herein, the content of a user-provided image may be extended without compromising the integrity and quality of the image generated by the image processing system.

For instance, a method, apparatus, and non-transitory computer readable medium for image extension using neural networks are described. One or more aspects of the method, apparatus, and non-transitory computer readable medium include obtaining an image (e.g., a source image, a user provided image, etc.) having an initial aspect ratio. A target aspect ratio may be identified that is different from the initial aspect ratio. The image may be positioned in an image frame having the target aspect ratio, where the image frame includes an image region containing the image and one or more extended regions outside the boundaries of the image. An extended image may be generated using a generative neural network, where the extended image includes the image in the image region and one or more generated image portions in the one or more extended regions, respectively, and wherein the one or more generated image portions comprise an extension of a scene element depicted in the image.

BRIEF DESCRIPTION OF THE DRAWINGS

FIG. 3 shows an example of an image extension process according to aspects of the present disclosure.

FIG. 4 shows an example of image processing according to aspects of the present disclosure.

FIG. 9 shows an example of a method for image processing according to aspects of the present disclosure.

DETAILED DESCRIPTION

Figure 1:
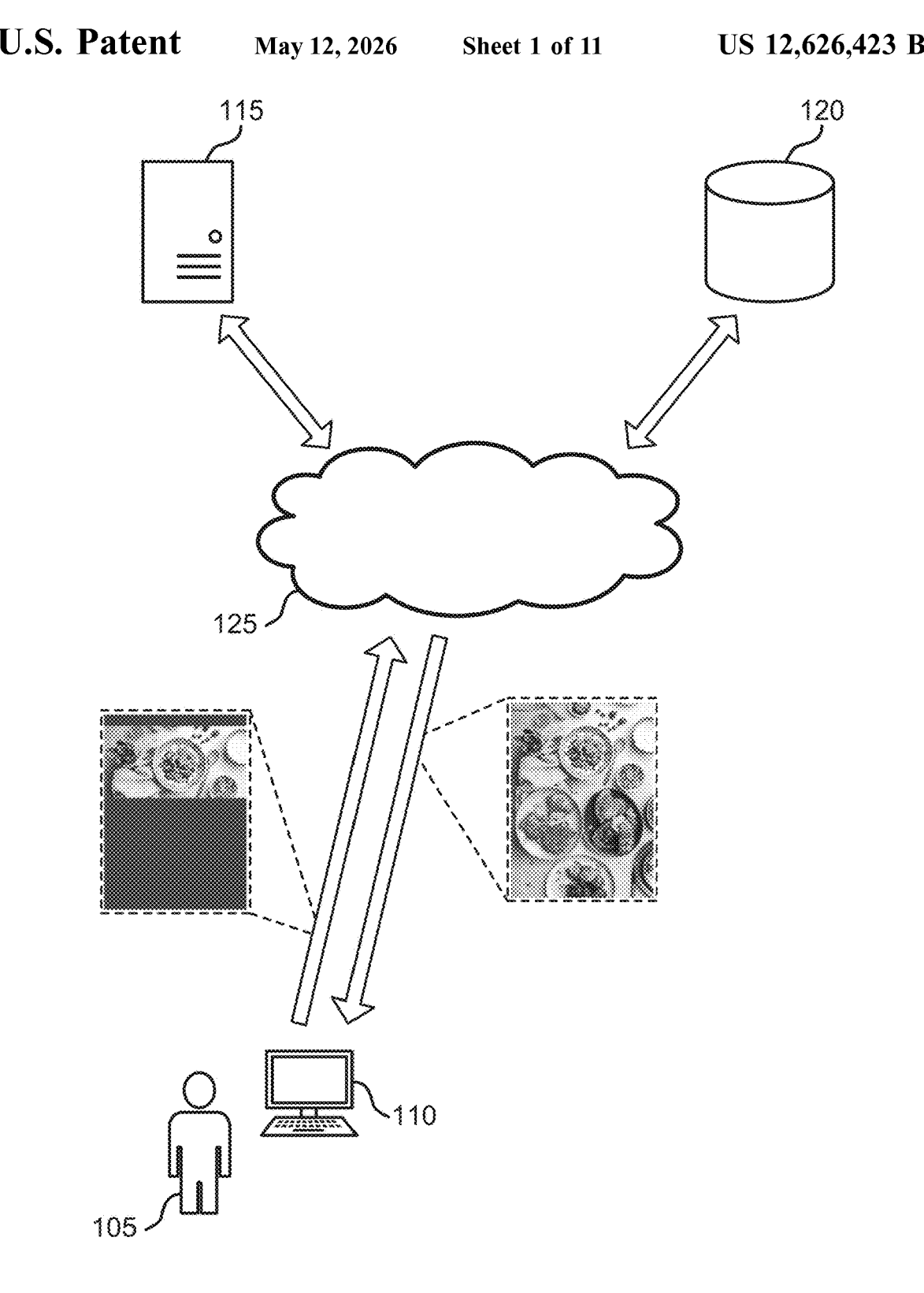
FIG. 1 shows an example of an image processing system according to aspects of the present disclosure.

The present disclosure relates to image processing using machine learning. Some embodiments of the disclosure relate to extending images using a trained neural network.

Despite the advancement of image processing technologies, many image processing systems are not user-friendly, or are inaccessible to non-expert users. For instance, many conventional image processing tools and software require specialized knowledge and skills, making it difficult for users with limited expertise to take full advantage of such image processing tools. As a result, users may struggle to achieve desired results, and the image processing tools may produce unsatisfactory outputs.

Specifically, image editing applications for extending an images (i.e., "uncropping" an image) sometimes require extensive skills and training to operate effectively. For example, these systems may use a large number of steps to extend an image. For example, multiple steps may be used to manually obtain an aspect ratio, position an image relative to a new frame having the target aspect ratio, obtain or generate content for extending the image, combine the image and the new content, and ensure consistency between the original content and the new content. Accordingly, there is a need in the art for improved image processing techniques that can accurately and efficiently process images (e.g., extend or uncrop images) while preserving the visual quality and important features of the original image.

The present disclosure describes systems and methods for image processing (e.g., image extension or image uncropping). Embodiments of the present disclosure include an efficient and user-friendly image processing system configured to generate an extended image representing an aspect ratio provided by the user. The image processing system automatically fills image content in extended regions surrounding the image and enables customization of extended images to make them suitable for different applications. For example, generated extended images may be used for various purposes, such as social media, digital art, presentations, etc.

According to an example embodiment, an image processing system may be configured to modify the position of an image within an image frame representing a target aspect ratio (e.g., an aspect ratio selected by a user that is different from an initial aspect ratio of a user provided image). Additionally or alternatively, an image processing system may perform image dilation to reduce artifacts in the boundary region of generated images. In another example embodiment, an image processing system may perform text-guided outpainting or content filling in a generated image. In addition to image extension, image positioning, image dilation, and text-guided outpainting, embodiments of the present disclosure also provide a user-friendly interface that enables a user to generate such extended images (e.g., based on desired image extension options described herein).

Embodiments of the present disclosure provide significant advantages over existing image processing techniques by offering improved image extension capabilities that are both efficient and user-friendly. The systems and techniques described herein may be implemented to accurately and effectively manipulate (e.g., extend, uncrop, etc.) digital images, allowing for precise adjustments to be made to extended regions surrounding an image region in generated extended images. Image editing tasks may be performed quickly and easily, without requiring extensive technical expertise. As such, the systems and techniques described herein may be implemented by a wider range of users, including professional photographers, graphic designers, and hobbyists.

Embodiments of the present disclosure can be used in the context of various image extension (e.g., image uncropping) applications. For example, an image processing system based on the present disclosure takes an image and user input to efficiently generate an extended image. Example embodiments of the present disclosure in the context of image processing systems are described with reference to FIGS. 1 through 3. Details regarding example image extension processes are provided with reference to FIGS. 4 through 8.

Image Processing Systems

FIG. 1 shows an example of an image processing system 100 according to aspects of the present disclosure. The example image processing system 100 shown includes user 105, user device 110, server 115, database 120, and cloud 125. Image processing system 100 is an example of, or includes aspects of, the corresponding element described with reference to FIG. 2.

Conventional image processing systems (e.g., conventional image uncropping tools) do not offer the ability for users 105 to automatically select regions to be outpainted. For example, an image uncropping tool may use bounding boxes to select regions within an image that need to be adapted. Additionally, such tools may use a diffusion-based generative model that may not run smoothly (i.e., result in high computational resources) and cause poor image resolution when a user 105 requests custom aspect ratios and outpainting of extended regions.

Embodiments of the present disclosure provide improved image extension systems and techniques that are efficient and user-friendly. As an example shown in FIG. 1, a user 105 may provide an image (e.g., as well as one or more user inputs). In the example of FIG. 1, the image may be provided within an image frame that is based on a user selected target aspect ratio. For instance, the image frame may include an image region comprising the image and one or more extended regions outside the image region (e.g., indicated by the purple color in the example of FIG. 1). In some examples, the image and user input (e.g., the selected target aspect ratio) may be transmitted to server 115 (e.g., an image processing apparatus), for example, via a user interface implemented on user device 110 and cloud 125.

For instance, in the example of FIG. 1, a user 105 may provide a target aspect ratio as well as a text input (e.g., "many French dishes on the table") that represents a text-guided content filling. In some examples, the server 115 generates an adapted image (i.e., an extended image), as shown in FIG. 1, that represents the image and the text-guided content filling. In other words, the server 115 may provide the user device 110 (e.g., via cloud 125) with an extended image, based on the target aspect ratio, that includes the image in the image region and generated image portions in the one or more extended regions, where the generated image portions include French dishes based on the text-guided input from the user 105.

For example, in image processing system 100, user device 110 and/or server 115 may identify a target aspect ratio, desired by the user, and position an image within an image frame based on the target aspect ratio. Further, using a generative neural network, image processing system 100 may generate an extended image that includes the user-provided image in an image region and extended regions surrounding the image region.

Accordingly, embodiments of the present disclosure provide an image processing system 100 configured to in paint and outpaint an image for various purposes. The image processing system 100 comprises a diffusion-based text-guided model. In some cases, the model supports a fixed set of aspect ratios at inference time. The image processing system 100 automatically creates a mask for a given user input. For example, the user input includes an image, a target resolution of an image, a shift position of an image within an image frame, a custom dilation for an image, and a text-based guidance prompt. According to some embodiments, the image processing system 100 performs image extension based on one or more aspects of user input.

Embodiments of the present disclosure include an image processing system 100 configured to generate an extended image that includes the original image and generated portions in an extended region of an image frame. The image processing system 100, during inference time, obtains an image having an initial aspect ratio. In some cases, the image is obtained from a user interface of a user device 110 or is captured using a camera. An image framing component identifies a target aspect ratio for the extended image. In some cases, the target aspect ratio is different from the initial aspect ratio. Further, the image framing component positions the image within the image frame having the target aspect ratio. For example, the image frame includes an image region containing the image and one or more extended regions outside the boundaries of the image. Finally, a generative neural network is used to generate an extended image.

According to some embodiments, the image processing system 100 provides a user-friendly interface to modify the position of the image within the image frame. In some examples, the user interface includes a slider that repositions an image in the image frame while maintaining the image aspect ratio. The image processing system 100 fills in the image content based on the position of the image within the frame to generate an extended image. In some embodiments, the image processing system 100 provides a dilation parameter that can be adjusted using a slider of the user interface to avoid artifacts in image boundaries.

An embodiment of the present disclosure includes text-based outpainting. In some cases, a user 105 specifies a text prompt for filling in the image content. For example, the image is a cropped image with food bowls on a table. The user 105 provides a text prompt (e.g., "many French dishes on the table"). The image processing system 100 extends the cropped image and the extended region includes "many French dishes on the table" as specified by the user 105.

Accordingly, the image processing system 100 can enlarge an image provided by the user 105. In some cases, the enlarged or extended image follows the aspect ratio provided by the user 105 through a user interface. In some examples, the user interface is an adaptable tool that provides for a user 105 to select from pre-defined aspect ratios (e.g., candidate aspect ratios, which may include square, widescreen, portrait, etc.), thus saving user time or provide a custom aspect ratio. Additionally, the image processing system 100 provides a user 105 with an interface to reposition or dilate an image. In some embodiments, the image processing system 100 fills in the content of an image based on a text prompt provided by the user 105. As a result, the image processing system 100 enables a user 105 to customize an image to suit any requirements without compromising the visual integrity and resolution of the original image.

User device 110 may be a personal computer, laptop computer, mainframe computer, palmtop computer, personal assistant, mobile device, or any other suitable processing apparatus. In some examples, the user device 110 includes software that incorporates an image processing application (e.g., an image extending application). The image editing application may either include or communicate with server 115. In some examples, the image extending application on user device 110 may include functions of server 115.

A user interface may enable user 105 to interact with user device 110. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code which is sent to the user device 110 and rendered locally by a browser.

In some aspects, server 115 provides one or more functions to users 105 linked by way of one or more of the various networks. In some cases, the server 115 includes a single microprocessor board, which includes a microprocessor responsible for controlling all aspects of the server. In some cases, a server 115 uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages).

In various embodiments, a server 115 comprises a general-purpose computing device, a personal computer, a laptop computer, a mainframe computer, a supercomputer, or any other suitable processing apparatus. For example, a server 115 may include a processor unit, a memory unit, an I/O module, etc. In some aspects, server 115 may include a computer implemented network. Server 115 may communicate with database 120 via cloud 125. In some cases, the architecture of the image processing network may be referred to as a network or a network model.

Cloud 125 is a computer network configured to provide on-demand availability of computer system resources, such as data storage and computing power. In some examples, cloud 125 provides resources without active management by the user 105. The term cloud is sometimes used to describe data centers available to many users 105 over the Internet. Some large cloud networks have functions distributed over multiple locations from central servers. A server is designated an edge server if it has a direct or close connection to a user 105. In some cases, cloud 125 is limited to a single organization. In other examples, cloud 125 is available to many organizations. In one example, cloud 125 includes a multi-layer communications network comprising multiple edge routers and core routers. In another example, cloud 125 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction. In some embodiments, database 120 is external to server 115 and communicates with server 115 via cloud 125.

Figure 2:
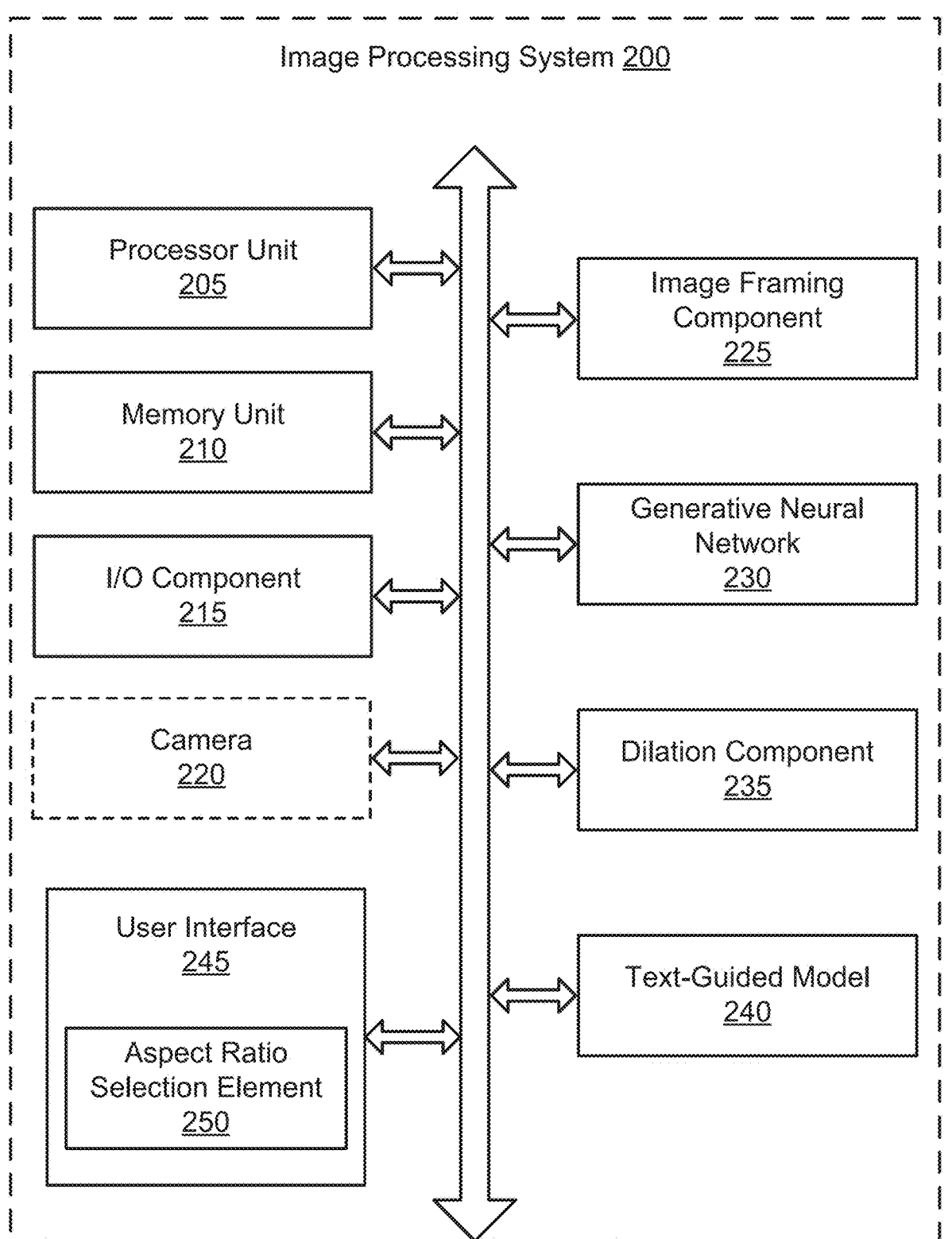
FIG. 2 shows an example of an image processing system according to aspects of the present disclosure.

FIG. 2 shows an example of an image processing system 200 according to aspects of the present disclosure. In some cases, image processing system 200 may also be referred to as image processing apparatus. Image processing system 200 is an example of, or includes aspects of, the corresponding element described with reference to FIG. 1. For example, in some implementations, image processing system 200 may be implemented as user device 110 or as server 115. In some implementations, image processing system 200 may be implemented via a combination of user device 110, server 115, database 120, and cloud 125 (e.g., where components of image processing system 200, and operations performed by image processing system 200, may be distributed across the user device 110, server 115, database 120, and cloud 125 according to various configurations). As described in more detail herein, image processing system 200 may be implemented for various image extension applications (e.g., for one-click image extension with quick mask adjustment).

According to an embodiment of the present disclosure, image processing system 200 includes processor unit 205, memory unit 210, I/O component 215, camera 220, image framing component 225, generative neural network 230, dilation component 235, text-guided model 240, and user interface 245 (e.g., which may include aspect ratio selection element 250).

Processor unit 205 includes one or more processors. A processor unit 205 is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some aspects, processor unit 205 includes special purpose components for modem processing, baseband processing, digital signal processing, or transmission processing.

Memory unit 210 includes one or more memory devices. Examples of a memory unit 210 include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

I/O component 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O component 215 includes a user interface. A user interface may enable a user to interact with a device. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

In some examples, image processing system 200 may include a camera 220. According to some implementations, camera 220 obtains an image having an initial aspect ratio. In some aspects, camera 220 may record or capture images, which may be stored locally, transmitted to another location, etc. For example, camera 220 may capture visual information using one or more photosensitive elements that may be tuned for sensitivity to a visible spectrum of electromagnetic radiation. The resolution of such visual information may be measured in pixels, where each pixel may relate an independent piece of captured information. Computation methods may use pixel information to reconstruct images captured by the camera 220. In some cases, each pixel may represent a sample of an original image. The color and intensity of each pixel is variable.

In some cases, image processing system 200 may not include camera 220 (e.g., the image may be obtained from a database).

According to some embodiments, image framing component 225 identifies a target aspect ratio different from the initial aspect ratio. In some examples, image framing component 225 positions the image in an image frame having the target aspect ratio, where the image frame includes an image region containing the image and one or more extended regions outside the boundaries of the image. In some examples, image framing component 225 provides a set of candidate aspect ratios. In some examples, image framing component 225 receives an aspect ratio input, where the target aspect ratio is identified from the set of candidate aspect ratios based on the aspect ratio input. In some examples, image framing component 225 receives a positioning input from the user, where the image is positioned in the image frame based on the positioning input. In some aspects, the extended image has a same dimension as the image and a different dimension than the image.

According to some embodiments of the present disclosure, image processing system 200 includes a computer implemented artificial neural network (ANN) for image generation (e.g., in some aspects, generative neural network 230 may include a ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some aspects, generative neural network 230 is a type of artificial neural network that can generate new data based on patterns it has learned from a training dataset. For example, unlike some discriminative neural networks, which are designed to classify or label input data, generative neural network 230 may generate new data that is similar to training data.

In some cases, generative neural network 230 may include a Generative Adversarial Network (GAN) architecture. A GAN is an ANN in which two neural networks (e.g., a generator and a discriminator) are trained based on a contest with each other. For example, the generator learns to generate a candidate by mapping information from a latent space to a data distribution of interest, while the discriminator distinguishes the candidate produced by the generator from a true data distribution of the data distribution of interest. The generator's training objective is to increase an error rate of the discriminator by producing novel candidates that the discriminator classifies as "real" (e.g., belonging to the true data distribution).

Therefore, given a training set, the GAN learns to generate new data with similar properties as the training set. For example, a GAN trained on photographs can generate new images that look authentic to a human observer. GANs may be used in conjunction with supervised learning, semi-supervised learning, unsupervised learning, and reinforcement learning.

Once the generative neural network 230 (e.g., a generator of generative neural network 230) has been trained, the generative neural network 230 can generate new images by sampling random noise from a normal distribution and passing it through the generative neural network 230. The generator may then output an image that has similar patterns and features to the training data, but is new and unique.

According to some aspects, generative neural network 230 generates an extended image, where the extended image includes the image in the image region and one or more generated image portions in the one or more extended regions, respectively. In some examples, generative neural network 230 receives an image prompt depicting an object, where the extended image includes the object in the one or more extended regions.

According to some aspects, dilation component 235 dilates the image to obtain a dilated image, where the dilated image is positioned in the image frame, and where the extended image is based on the dilated image.

According to some aspects, text-guided model 240 receives a text prompt, where the extended image is generated based on the text prompt. In some aspects, the one or more generated image portions of the extended image are generated based on the text prompt. For example, text-guided model is a diffusion-based text-guided model.

According to some aspects, user interface 245 includes aspect ratio selection element 250. Aspect ratio selection element 250 may provide a plurality of candidate aspect ratios. In some aspects, aspect ratio selection element 250 receives an aspect ratio input indicating a target aspect ratio (e.g., where the target aspect ratio is identified, by the aspect ratio selection element 250, from the plurality of candidate aspect ratios based on the aspect ratio input). As such, in some implementations, the image framing component 225 positions the image in an image frame based on the aspect ratio input from aspect ratio selection element 250.

In some aspects, user interface 245 displays the extended image (e.g., in response to received aspect ratio input via aspect ratio selection element 250). For example, user interface 245 may comprise a conventional monitor, a monitor coupled with an integrated display, an integrated display (e.g., an LCD display), or other means for viewing associated data or processing information. In some cases, user interface 245 comprises a touch screen. Output devices other than a display can be used, such as other computers or data storage devices, and computer networks.

In some aspects, user interface 245 may include an image selection element (e.g., which may obtain the image). In some aspects, user interface 245 may receive a positioning input (e.g., where the image is positioned in the image frame based on the positioning input).

FIG. 3 shows an example of an image extension process 300 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system obtains an image. In some cases, the operations of this step refer to, or may be performed by, an image processing system (e.g., image processing apparatus) as described with reference to FIGS. 1 and 2. In some cases, the image is submitted by the user for extension to a desired (e.g., target) aspect ratio. For instance, in the example of FIG. 3, the image may include food bowls on a table.

At operation 310, the system provides image extension options to the user (e.g., via a user interface of a user device). In some cases, the operations of this step refer to, or may be performed by, an image processing system as described with reference to FIGS. 1 and 2. In some cases, the image extension options refer to user input for image extension (e.g., image generation in extended regions) applied to the image. For example, image extension options may include candidate aspect ratio options, image position options, image dilation options, and text-guided outpainting options, among other examples. Further details regarding use of the image extension options are provided with reference to FIGS. 5-8.

At operation 315, the user selects an image extension option. In some cases, the user selects more than one image extension option. In some cases, the operations of this step refer to, or may be performed by, a user as described with reference to FIG. 1. For example, a user may select a text-guided outpainting option for image extension. Accordingly, a user may specify (e.g., type, input, etc.) text for content filling of the image, and the user may provide the text prompt to the image processing system (e.g., such as image processing system 200 described with reference to FIG. 2). For instance, in the example of FIGS. 1, 3, and 8, a user may provide a text prompt "many French dishes on the table" for content filling of the image.

At operation 320, the system generates an extended image. In some cases, the operations of this step refer to, or may be performed by, a generative neural network as described with reference to FIG. 2. A generative neural network of an image processing system may take the user provided image and a text prompt to generate an extended image.

According to the techniques and systems described herein, images may be extended more efficiently (e.g., based on reduced user input). For example, an image may be extended in multiple directions (e.g., up, down, left, right, etc.) without separate input for configuring extension in each direction. For instance, a single input (e.g., a target aspect ratio selection) may configure image extension in multiple areas (e.g., in extended regions above an upper boundary of the image, in extended regions below a lower boundary of the image, in extended regions to the left of a left boundary of the image, in extended regions to the right of a right boundary of the image, etc.). Such may reduce user input and streamline processing for image extension in multiple extended regions outside the boundaries of the image, as the user may not necessarily need to configure image extension several times for each extended region separately. For any target aspect ratio, the techniques and systems described herein may be implemented for one-click image extension (e.g., where one aspect ratio selection results in multiple image extensions on different sides of the image, rather than one-to-one manual selection of multiple regions to extend).

In some examples, the extended image may be presented to the user (e.g., via a user interface). The extended image includes the user provided image and an extension to the image (e.g., an extended portion) that is filled based on a target aspect ratio selected by the user, based on a text prompt provided by the user, based on a dilation parameter provided by the user, etc. The extended image can be used for various applications, for example, such as social media, digital art, presentations, etc.

FIG. 4 shows an example of a method 400 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains an image having an initial aspect ratio (e.g., an initial aspect ratio associated with the image, which may be based on a camera and/or settings used to capture the image, etc.). In some cases, the operations of this step refer to, or may be performed by, a camera as described with reference to FIG. 2. In some cases, the image is provided by the user. In some cases, the image is provided by the image processing system (e.g., via a database of the image processing system or a database in connection with the image processing system).

At operation 410, the system identifies a target aspect ratio different from the initial aspect ratio. In some examples, the target aspect ratio may be selected, by a user, from a plurality of candidate aspect ratios provided by an image processing system. In some cases, the operations of this step refer to, or may be performed by, an image framing component as described with reference to FIG. 2.

According to an embodiment of the present disclosure, image framing component (e.g., image framing component 225) extends the content of the image to the target aspect ratio. In some examples, the image framing component includes square, widescreen, landscape, or portrait as pre-defined aspect ratios. Additionally, image framing component enables users to customize the image to suit any conditions of candidate aspect ratios (e.g., which may or may not be included in the pre-defined aspect ratios).

At operation 415, the system positions the image in an image frame having the target aspect ratio, where the image frame includes an image region containing the image and one or more extended regions outside the boundaries of the image. In some cases, the operations of this step refer to, or may be performed by, an image framing component as described with reference to FIG. 2. Further detail regarding positioning of the image within the image frame is described with reference to FIG. 6.

At operation 420, the system generates an extended image using a generative neural network, where the extended image includes the image in the image region and one or more generated image portions in the one or more extended regions, respectively. In some cases the one or more generated image portions comprise an extension of a scene element depicted in the image. In some cases, the operations of this step refer to, or may be performed by, a generative neural network as described with reference to FIG. 2. For example, the extended image is a high-quality image that includes the user provided image in an image region and content (e.g., extended image) filled in the extended regions using image extension options (as described with reference to FIG. 3).

Therefore, a method, apparatus, and non-transitory computer readable medium are described. One or more aspects of the method, apparatus, and non-transitory computer readable medium include obtaining an image having an initial aspect ratio; identifying a target aspect ratio different from the initial aspect ratio; positioning the image in an image frame having the target aspect ratio, wherein the image frame includes an image region containing the image and one or more extended regions outside the boundaries of the image; and generating an extended image using a generative neural network, wherein the extended image includes the image in the image region and one or more generated image portions in the one or more extended regions, respectively.

Some examples of the method, apparatus, and non-transitory computer readable medium further include providing a plurality of candidate aspect ratios. Some examples further include receiving an aspect ratio input, wherein the target aspect ratio is identified from the plurality of candidate aspect ratios based on the aspect ratio input. Some examples of the method, apparatus, and non-transitory computer readable medium further include receiving a positioning input from the user, wherein the image is positioned in the image frame based on the positioning input. In some aspects, the extended image has a same dimension as the image and a different dimension than the image. Some examples of the method, apparatus, and non-transitory computer readable medium further include dilating the image to obtain a dilated image, wherein the dilated image is positioned in the image frame, and wherein the extended image is based on the dilated image.

Some examples of the method, apparatus, and non-transitory computer readable medium further include receiving a text prompt, wherein the extended image is generated based on the text prompt. In some aspects, the one or more generated image portions of the extended image are generated based on the text prompt. Some examples of the method, apparatus, and non-transitory computer readable medium further include receiving an image prompt depicting an object, wherein the extended image includes the object in the one or more extended regions.

Image Extension Processes

Figure 5:
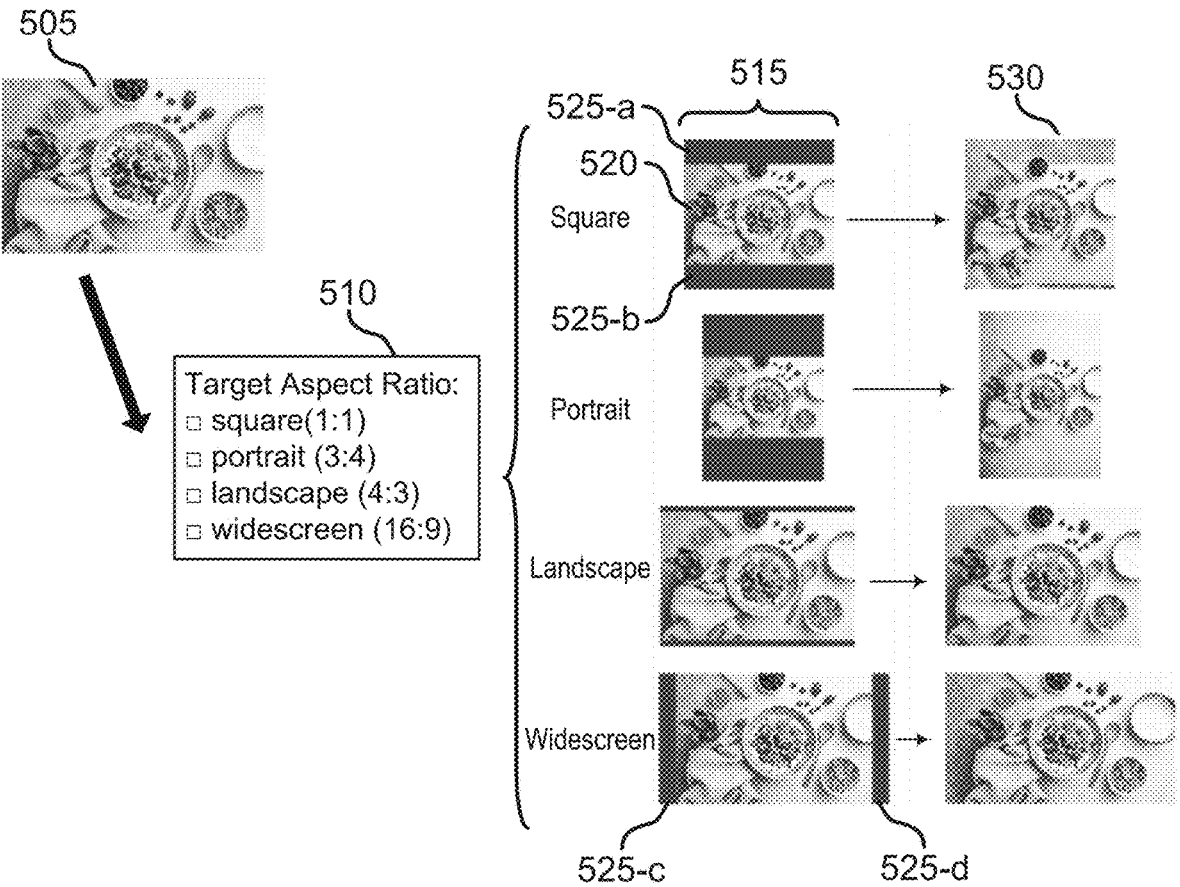
FIG. 5 shows an example of an image extension process based on aspect ratio selection according to aspects of the present disclosure.

FIG. 5 shows an example of an image extension process 500 based on aspect ratio selection according to aspects of the present disclosure. Image extension process 500 is an example of, or includes aspects of, the corresponding element described with reference to FIGS. 6-8. According to an embodiment, image extension process 500 includes image 505, candidate aspect ratios 510, image frame 515, and extended image 530.

According to an embodiment of the present disclosure, an image processing system (e.g., image processing system 100 and 200 described with reference to FIGS. 1 and 2) obtains image 505 having some initial aspect ratio. Image 505 is an example of, or includes aspects of, the corresponding element described with reference to FIGS. 6-8. As described herein, image 505 may be provided to the image processing system by a user, may be an image obtained from a database of an image processing system, etc.

In certain aspects, an aspect ratio may refer to a proportional relationship between a width and a height of an image. Accordingly, a target aspect ratio may refer to a target (e.g., desired, user configured, etc.) relationship between a width and a height of a generated (e.g., output) extended image 530. Moreover, candidate aspect ratios 510 may refer to one or more possible (e.g., available, selectable, etc.) relationships between width and height of generated (e.g., output) extended images 530. In some cases, an aspect ratio may be expressed as two values (e.g., numbers separated by a colon, such as 4:3, 16:9, etc.) that indicate the ratio of width to height.

Accordingly, in some cases, an aspect ratio may define or configure shape and appearance of an image, which may impact many factors such as image resolution, image extension aspects described herein, overall visual aesthetics of the image presentation, etc. For instance, to display an image on a device or a display region that has a different aspect ratio from the original image 505, a target aspect ratio (e.g., similar to, or matching, an aspect ratio of the device/display region) may be selected and image extension techniques described herein may be applied to extend the image (e.g., with contents generated in extended regions) based on the target aspect ratio. In some examples, the image may be extended such that content is generated in extended regions 525 outside of the image region 520 to fill the image frame 515 defined by the selected target aspect ratio. Such may reduce distortion which may improve the appearance throughout the extended image 530.

In some cases, an image processing system includes a user interface that provides for a user to select a target aspect ratio. For example, the image framing component of an image processing system may provide a user with an option to select a target aspect ratio from candidate (e.g., predefined) aspect ratios 510. Referring to the example of FIG. 5, an image framing component of an image processing system provides candidate aspect ratios 510 including "square(1:1)", "portrait(3:4)", "landscape(4:3)", "widescreen(16:9)" to the user (e.g., via a user interface of a user device).

As an example shown in FIG. 5, the user, using one click, selects a target aspect ratio from the pre-defined candidate aspect ratios 510. However, embodiments of the present disclosure are not limited thereto, and the user can provide any other aspect ratio (e.g., a customized aspect ratio) for image extension. An image framing component may position image 505 in image frame 515 having the target aspect ratio. Image frame 515 is an example of, or includes aspects of, the corresponding element described with reference to FIGS. 6-8. In some examples, the candidate aspect ratios 510 may be provided via an aspect ratio selection element 250.

The example image extension process 500 shows image 505 in image frames 515 for each of the example candidate aspect ratios 510. According to some embodiments, an image frame 515 includes an image region 520 and one or more extended regions 525 (e.g., 525-*a*, 525-*b*, 525-*c*, 525-*d*, etc.). For example, image region 520 refers to the region of an image frame 515 that includes the image 505, and extended regions 525 refer to the region of an image frame 515 that is outside the boundaries of image 505. For instance, in the example of FIG. 5, extended regions 525 refer to the purple region in image frames 515. Image region 520 is an example of, or includes aspects of, the corresponding element described with reference to FIGS. 6-8. Extended region 525 is an example of, or includes aspects of, the corresponding element described with reference to FIGS. 6-8.

As described herein, image processing systems may include a generative neural network based on a diffusion model to generate extended images 530. In some cases, the generated extended image 530 represents pre-defined aspect ratios (e.g., square, widescreen, landscape, or portrait, which may be selected by a user as a target aspect ratio).

In some cases, the extended image 530 has a same dimension as the image 505 and a different dimension than the image 505. For instance, in the example of FIG. 5, if a user selects a 'square' target aspect ratio, extended regions 525-*a* and 525-*b* are generated such that the extended image 530 may have a same width dimension as the image 505 and a different height dimension than the image 505. In another example of FIG. 5, if a user selects a 'widescreen' target aspect ratio, extended regions 525-*c* and 525-*d* are generated such that the extended image 530 may have a same height dimension as the image 505 and a different width dimension than the image 505. In some cases, the user customizes image 505 to suit a desired application and obtains a high-quality image. Extended image 530 is an example of, or includes aspects of, the corresponding element described with reference to FIGS. 6 and 8.

Generally, the example image extension processes 500, 600, 700, and 800 show one or more aspects of systems and techniques described herein. For example, an initial image may be processed by an image processing system to generate an extended image, where the extended image is generated according to an image frame that includes an image region (including the initial image) and one or more extended regions around the image region within the boundaries of the image frame (e.g., where the image frame may represent a target aspect ratio).

For generation of an extended image, image processing systems described herein may implement image outpainting and image inpainting techniques that involve filling in missing or incomplete parts of an image. Image outpainting may include generating new content (e.g., extended regions) beyond the boundaries of an image (e.g., an initial image region) based on surrounding image information, user input, etc. Image outpainting may extend an image in a plausible and realistic way, while maintaining the visual coherence and consistency of the generated extended image. In some cases, outpainting may be used to increase the resolution of an image, to generate one or more generated image portions in one or more extended regions that were not captured in the initial image region, etc.

Figure 6:
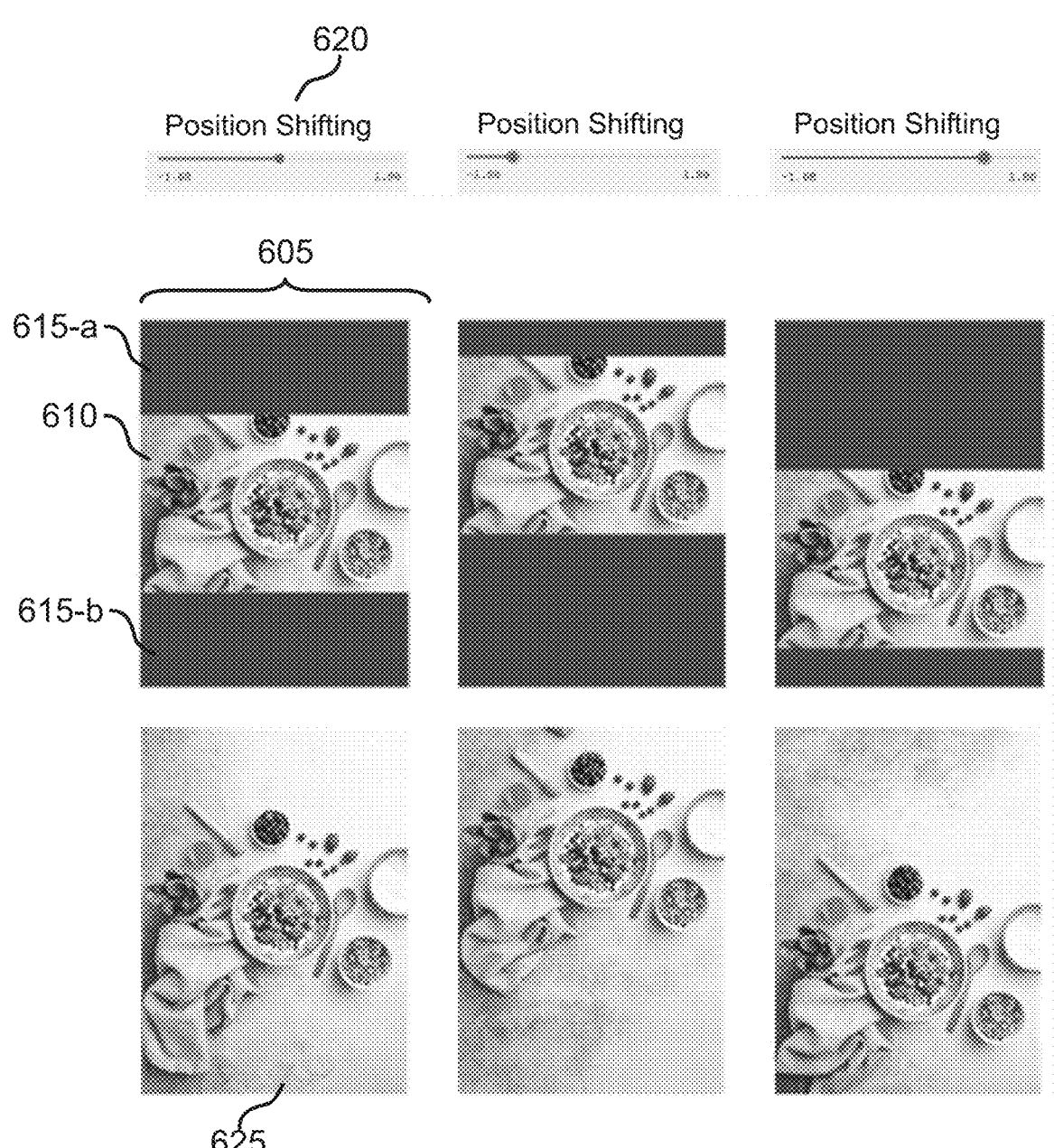
FIG. 6 shows an example of an image extension process based on user image shifting according to aspects of the present disclosure.

FIG. 6 shows an example of an image extension process 600 based on user image shifting according to aspects of the present disclosure. Image extension process 600 is an example of, or includes aspects of, the corresponding element described with reference to FIGS. 5, 7, and 8. According to an embodiment, image extension process 600 includes image frame 605, positioning input 620, and extended image 625.

Image frame 605 is an example of, or includes aspects of, the corresponding element described with reference to FIGS. 5, 7, and 8. In one aspect, image frame 605 includes image region 610 and extended region 615 (e.g., 615-*a* and 615-*b* indicated via purple coloring). Image region 610 is an example of, or includes aspects of, the corresponding element described with reference to FIGS. 5, 7, and 8. Extended region 615 is an example of, or includes aspects of, the corresponding element described with reference to FIGS. 5, 7, and 8. The descriptions of image extension process and image frame described with reference to FIG. 6 are similar to FIG. 5, and hence repeated descriptions are omitted for brevity.

In some cases, an image framing component of an image processing system includes a user interface for obtaining positioning input 620 from the user. Referring to the example of FIG. 6, the user provides positioning input 620 to specify the position (e.g., the vertical position) of the image within image frame 605 using image slider. For example, the image is in the middle of image frame 605 when the image slider is in the middle on a scale ranging between "−1.00" and "1.00" (i.e., image slider indicates a value of "0.00") of positioning input 620. Hence, areas of extended region 615-*a* and 615-*b* are equal.

Additionally, when the user changes positioning input 620 by moving the image slider to a different value on the scale (e.g., "−0.62"), the position of the image within image frame 605 changes, i.e., image shift to the upper region of image frame 605. Accordingly, the area of extended region 615-*a* decreases and area of extended region 615-*b* increases. Similarly, when the user changes positioning input 620 by moving the image slider to a different value on the scale (e.g., "0.59"), the position of the image within image frame 605 changes, i.e., image shift to the lower region of image frame 605. Accordingly, the area of extended region 615-*a* increases and area of extended region 615-*b* decreases.

However, embodiments of the present disclosure are not necessarily limited thereto. Generally, an image processing system may include various positioning input 620 allowing a user to position the image region 610 within the image frame 605. The positioning input 620 may include positioning arrows (e.g., up/down/left/right arrows, such as arrows on a keyboard), a drag positioning input (e.g., by dragging the image region 610 with a pointing device, such as a mouse), etc. For example, the user can press the upward arrow key to move the image towards the upper region of image frame 605. Similarly, the user can press the downward arrow key to change the position of the image to the lower region of image frame 605. In some embodiments, the positioning input 620 may be used to efficiently configure the generation of new content in extended regions 615 that are configurable based on the positioning input 620. For example, the target aspect ratio and positioning input 620 may configure the size and position of the extended regions in which new content is generated. In some aspects, the target aspect ratio and/or positioning input 620 may adjust the position of extended regions 615 (e.g., and thus configure the content generated in extended regions 615). In some aspects, the target aspect ratio and/or positioning input 620 may configure one-click image extension of the image (e.g., rather than a user manually providing boundary boxes, manually extending an image in multiple iterations/directions, etc.).

Accordingly, by providing an ability to slide the image region 610 position within an image frame 605, the image processing system enables a user to have increased control over the generation of extended images 625. In some embodiments, a user may select a target aspect ratio, and the positioning input 620 may allow the user to position the image region 610 within an image frame 605 that represents the target aspect ratio, thus giving the user increased control over the generation of extended images 625 (e.g., increased control over the location of extended regions 615, the content that is filled in extended regions 615, etc.).

According to an embodiment, the image extension process 600 provides for users to highlight a region of the image to fill in image content while maintaining an aspect ratio. For example, if the user highlights the right side of an image while maintaining a particular aspect ratio, the user can use a slider to reposition the image to the left before filling in the image content to generate extended image 625. In some cases, extended image 625 is of the same width and different height as the image in image region 610. In some cases, extended image 625 is of the different width and same height as the image in image region 610. Extended image 625 is an example of, or includes aspects of, the corresponding element described with reference to FIGS. 5 and 8.

Referring to FIG. 6, an example generated extended image 625 that corresponds to image slider value of "0.00" in positioning input 620 may represent image region 610 positioned in the middle of image frame 605 and the extended regions 615 outside the boundary of image region 610 that are filled with image content. Similarly, the extended image 625 corresponding to image slider value of "−0.62" in positioning input 620 represents image region 610 in the upper region of image frame 605 and the extended region (i.e., in the lower region of image frame 605) that is filled with image content. The extended image corresponding to image slider value of "0.59" in positioning input 620 represents image region 610 in the lower region of the image frame 605 and the extended region (i.e., in the upper region of image frame 605) that is filled with image content.

Figure 7:
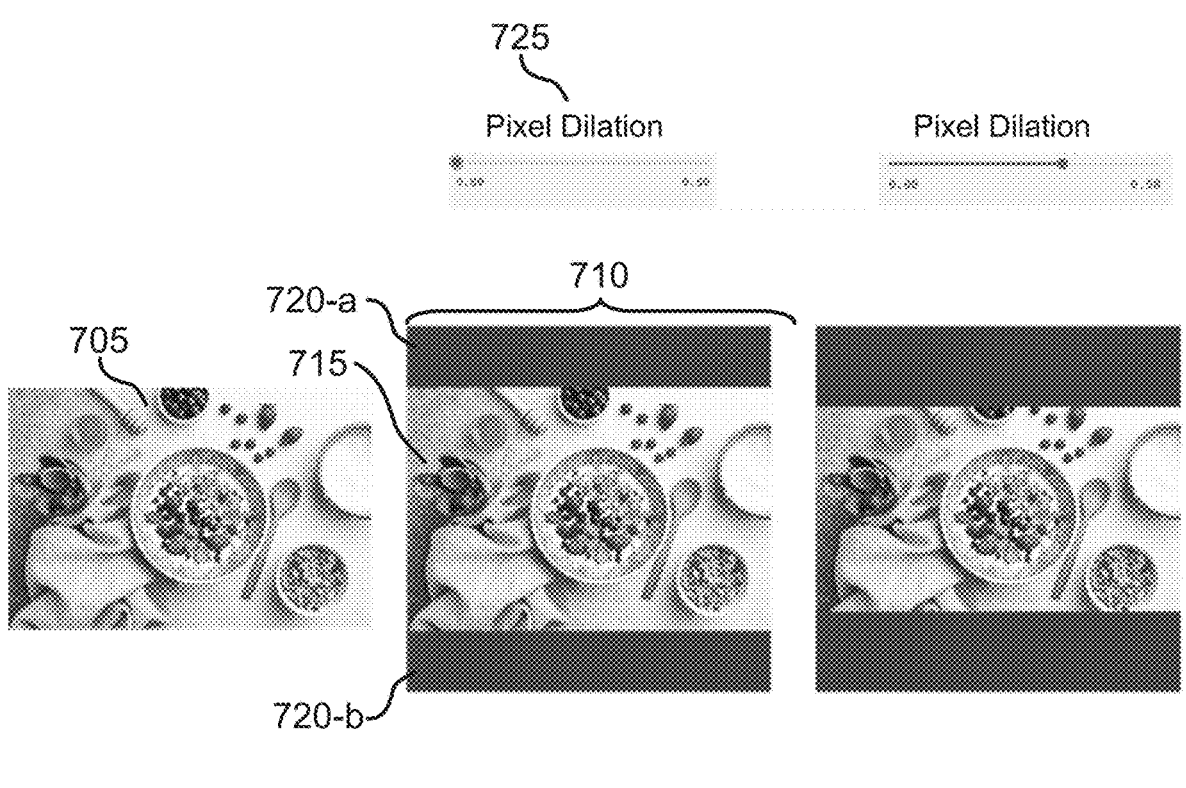
FIG. 7 shows an example of an image extension process based on pixel dilation according to aspects of the present disclosure.

FIG. 7 shows an example of an image extension process 700 based on pixel dilation according to aspects of the present disclosure. Image extension process 700 is an example of, or includes aspects of, the corresponding element described with reference to FIGS. 5, 6, and 8. In one aspect, image extension process 700 includes image 705, image frame 710, and dilation parameter 725.

According to an embodiment of the present disclosure, an image processing system may remove boundary artifacts in image 705. Image 705 is an example of, or includes aspects of, the corresponding element described with reference to FIG. 5. Image frame 710 is an example of, or includes aspects of, the corresponding element described with reference to FIGS. 5, 6, and 8. In one aspect, image frame 710 includes image region 715 and extended region 720 (e.g., 720-*a* and 720-*b* indicated in purple color). The descriptions of image extension process and image frame described with reference to FIG. 7 are similar to FIG. 5, and hence repeated descriptions are omitted for brevity.

According to an embodiment of the present disclosure, a dilation component (e.g., dilation component 235 as described with reference to FIG. 2) may include a pixel dilation parameter 725 to dilate image 705 to remove boundary artifacts. For example, the dilation component dilates image 705 to obtain a dilated image. Referring to FIG. 7, pixel dilation parameter 725 refers to a slider-based user interface. In some cases, the slider is adjusted to change the dilation parameter.

For example, when the slider of pixel dilation parameter indicates a value of "0.00" on a scale ranging from "0.00" to "0.50", image 705 is positioned in image region 715. In some cases, image 705 in image region 715 includes boundary artifacts that the user wants to remove. As shown in FIG. 7, the user changes the value of pixel dilation parameter 725 using the slider to "0.32". As shown in the image frame corresponding to pixel dilation parameter of 0.32, the image region 715 is cropped in the boundary area and has no artifacts in the boundary region. Accordingly, the area of extended region 720 (e.g., 720-*a* and 720-*b*) increases. Image region 715 is an example of, or includes aspects of, the corresponding element described with reference to FIGS. 5, 6, and 8. Extended region 720 is an example of, or includes aspects of, the corresponding element described with reference to FIGS. 5, 6, and 8.

Figure 8:
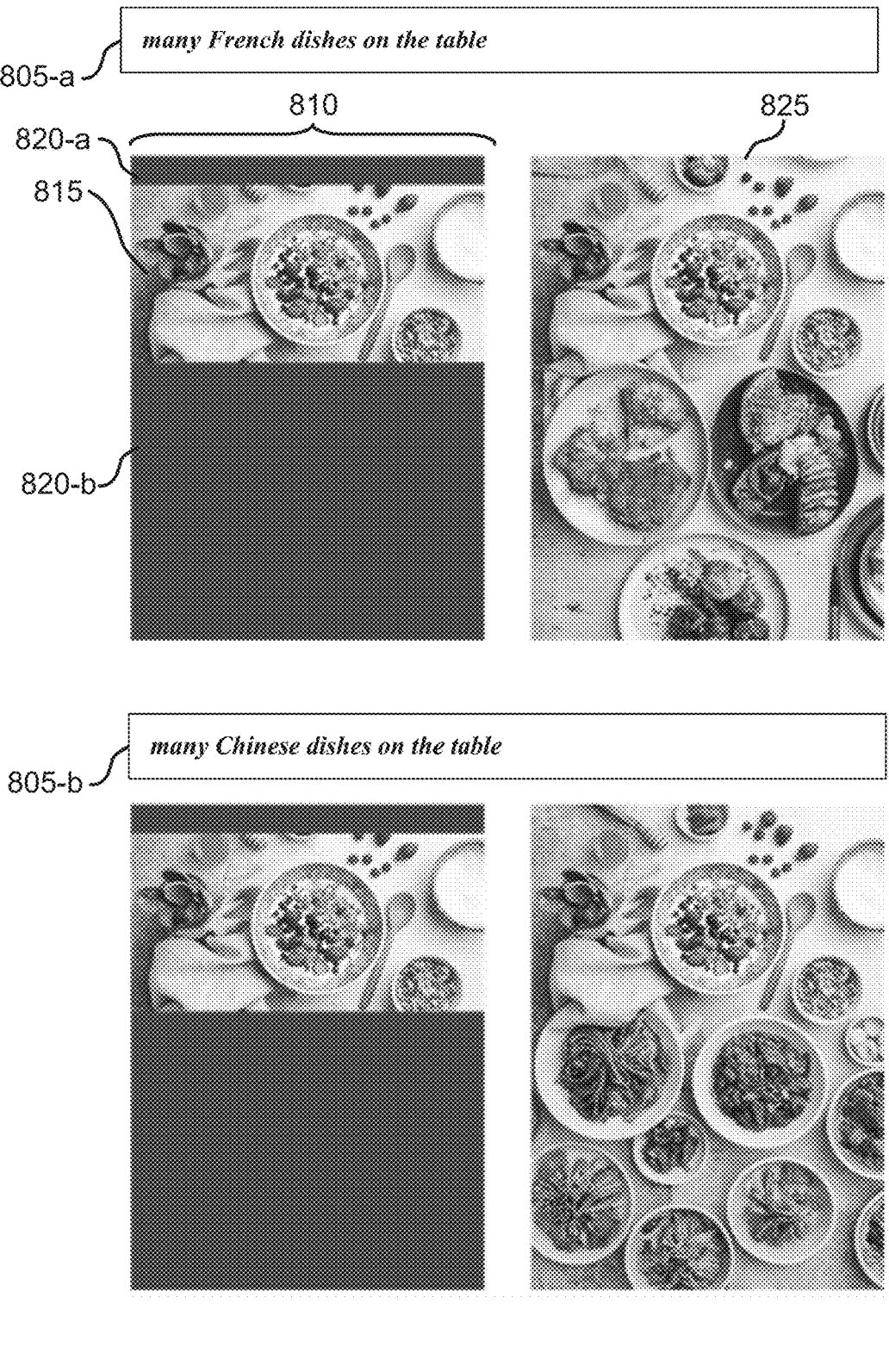
FIG. 8 shows an example of an image extension process based on text guided outpainting according to aspects of the present disclosure.

FIG. 8 shows an example of an image extension process 800 based on text guided outpainting according to aspects of the present disclosure. Image extension process 800 is an example of, or includes aspects of, the corresponding element described with reference to FIGS. 5-7. According to an embodiment, image extension process 800 includes text prompt 805, image frame 810, and extended image 825.

Image frame 810 is an example of, or includes aspects of, the corresponding element described with reference to FIGS. 5-7. In one aspect, image frame 810 includes image region 815 and extended region 820 (e.g., 820-*a* and 820-*b* indicated in purple color). Image region 815 is an example of, or includes aspects of, the corresponding element described with reference to FIGS. 5-7. Extended region 820 is an example of, or includes aspects of, the corresponding element described with reference to FIGS. 5-7. The descriptions of image extension process and image frame described with reference to FIG. 8 are similar to FIG. 5, and hence repeated descriptions are omitted for brevity.

Referring to FIG. 8, image frame 810 indicates image region 815 in the upper region of image frame 810. In some cases, the positioning of image region 815 within image 810 is specified using image slider as described with reference to FIG. 6. According to an embodiment, the image processing system is configured to perform text guided outpainting. In some cases, the user provides text prompt 805, via a user interface, that specifies the content for filling extended region 820 (e.g., 820-*a* and 820-*b*) of image frame 810.

As an example shown in FIG. 8, image frame 810 includes image region 815 with food bowls on a table and extended region 820 indicated in purple color. The user may provide text prompt 805-*a* (e.g., "many French dishes on the table") text prompt 805-*b* (e.g., "many Chinese dishes on the table") that specifies the content to be filled in the extended region (e.g., in extended regions 820-*a* and 820-*b*). The text-guided model of the image processing system (e.g., text-guided model 240 described with reference to FIG. 2) receives the text prompt and generates image content for extended regions 820 (e.g., extended regions 820-*a* and 820-*b*) based on the text prompt 805. The image processing system generates extended image 825 that includes image region 815 and extended regions 820 (e.g., extended regions 820-*a* and 820-*b*) with text-based image content. Extended image 825 is an example of, or includes aspects of, the corresponding element described with reference to FIGS. 5 and 6.

FIG. 9 shows an example of a method 900 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system provides a user interface including an aspect ratio selection element. In some cases, the operations of this step refer to, or may be performed by, an image processing system as described with reference to FIGS. 1 and 2.

At operation 910, the system receives an aspect ratio input, where the aspect ratio input indicates a target aspect ratio. In some cases, the operations of this step refer to, or may be performed by, an image processing system (e.g., via a user interface or aspect ratio selection element) as described with reference to FIGS. 1 and 2.

At operation 915, the system positions an image in an image frame having the target aspect ratio, where the image frame includes an image region containing the image and one or more extended regions outside the boundaries of the image. In some cases, the operations of this step refer to, or may be performed by, an image processing system (e.g., via a user interface or positioning input) as described with reference to FIGS. 1 and 2.

At operation 920, the system generates an extended image using a generative neural network, where the extended image includes the image in the image region and one or more generated image portions in the one or more extended regions, respectively. In some cases, the operations of this step refer to, or may be performed by, an image processing system (e.g., a generative neural network) as described with reference to FIGS. 1 and 2.

At operation 925, the system displays the extended image via the user interface in response to the received aspect ratio input. In some cases, the operations of this step refer to, or may be performed by, an image processing system (e.g., via a user interface or display) as described with reference to FIGS. 1 and 2.

Figure 10:
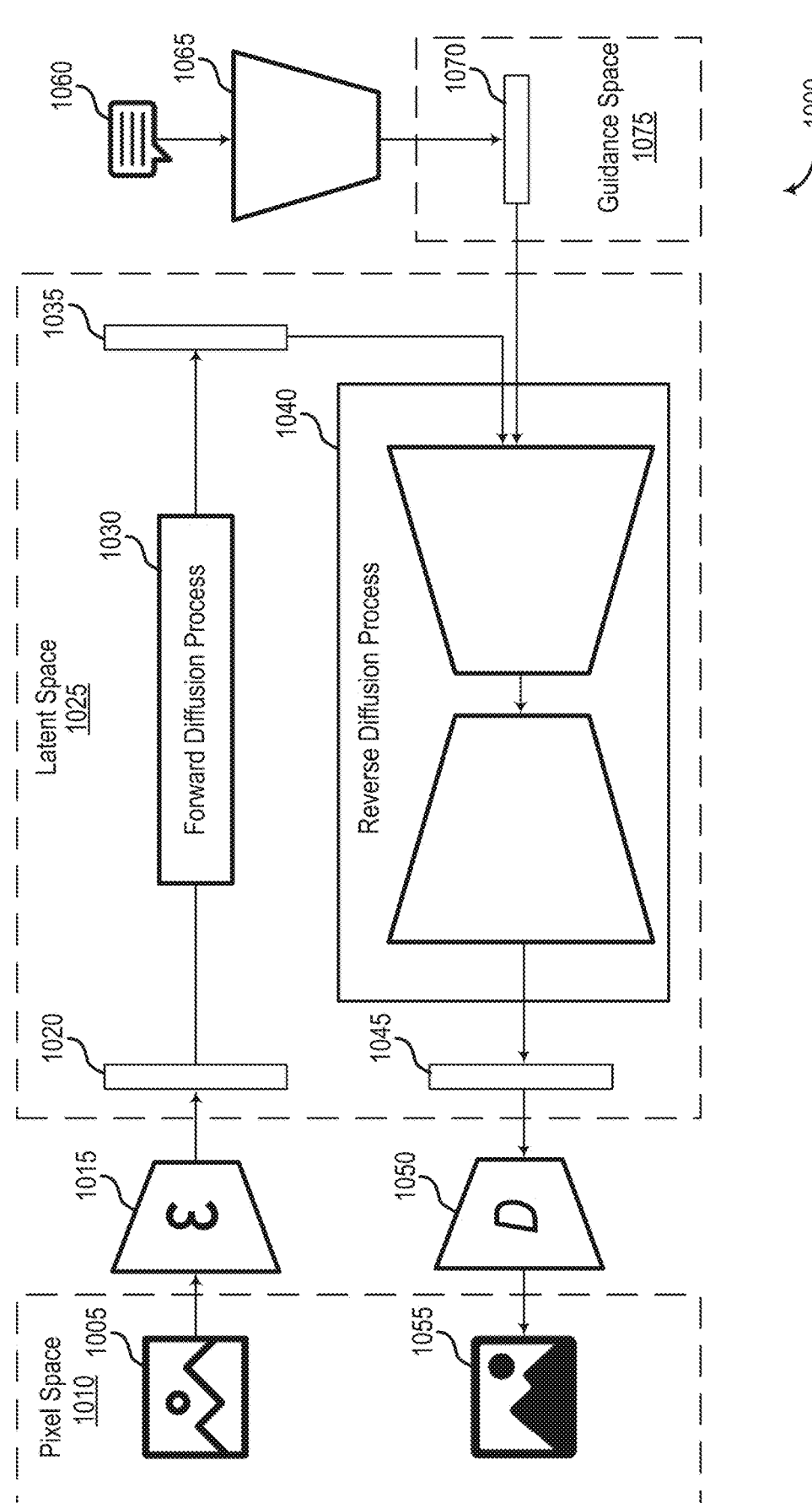
FIG. 10 shows an example of a guided latent diffusion model according to aspects of the present disclosure.

FIG. 10 shows an example of a guided latent diffusion model 1000 according to aspects of the present disclosure. As an example shown in FIG. 10, an image generation network (such as the image generation network described with reference to FIG. 2) can be implemented based on a diffusion model (e.g., a latent diffusion model or a pixel diffusion model). The guided latent diffusion model 1000 depicted in FIG. 10 is an example of, or includes aspects of, the generative neural network and text-guided model described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1000 may take an original image 1005 in a pixel space 1010 as input and apply and image encoder 1015 to convert original image 1005 into original image features 1020 in a latent space 1025. Then, a forward diffusion process 1030 gradually adds noise to the original image features 1020 to obtain noisy features 1035 (also in latent space 1025) at various noise levels.

Next, a reverse diffusion process 1040 (e.g., a U-Net ANN) gradually removes the noise from the noisy features 1035 at the various noise levels to obtain denoised image features 1045 in latent space 1025. In some examples, the denoised image features 1045 are compared to the original image features 1020 at each of the various noise levels, and parameters of the reverse diffusion process 1040 of the diffusion model are updated based on the comparison. Finally, an image decoder 1050 decodes the denoised image features 1045 to obtain an output image 1055 in pixel space 1010. In some cases, an output image 1055 is created at each of the various noise levels. The output image 1055 can be compared to the original image 1005 to train the reverse diffusion process 1040.

In some cases, image encoder 1015 and image decoder 1050 are pre-trained prior to training the reverse diffusion process 1040. In some examples, they are trained jointly, or the image encoder 1015 and image decoder 1050 and fine-tuned jointly with the reverse diffusion process 1040.

The reverse diffusion process 1040 can also be guided based on a text prompt 1060, or another guidance prompt, such as an image, a layout, a segmentation map, etc. The text prompt 1060 can be encoded using a text encoder 1065 (e.g., a multimodal encoder) to obtain guidance features 1070 in guidance space 1075. The guidance features 1070 can be combined with the noisy features 1035 at one or more layers of the reverse diffusion process 1040 to ensure that the output image 1055 includes content described by the text prompt 1060. For example, guidance features 1070 can be combined with the noisy features 1035 using a cross-attention block within the reverse diffusion process 1040.

Therefore, a method, apparatus, and non-transitory computer readable medium are described. One or more aspects of the method, apparatus, and non-transitory computer readable medium include providing a user interface including an aspect ratio selection element; receiving an aspect ratio input via the user interface, wherein the aspect ratio input indicates a target aspect ratio; positioning an image in an image frame having the target aspect ratio, wherein the image frame includes an image region containing the image and one or more extended regions outside the boundaries of the image; generating an extended image using a generative neural network, wherein the extended image includes the image in the image region and one or more generated image portions in the one or more extended regions, respectively; and displaying the extended image via the user interface in response to the received aspect ratio input.

Some examples of the method, apparatus, and non-transitory computer readable medium further include obtaining the image via an image selection element of the user interface. Some examples of the method, apparatus, and non-transitory computer readable medium further include providing a plurality of candidate aspect ratios via the aspect ratio selection element, wherein the plurality of candidate aspect ratios comprises the aspect ratio input. Some examples of the method, apparatus, and non-transitory computer readable medium further include receiving a positioning input via the user interface, wherein the image is positioned in the image frame based on the positioning input.

Figure 11:
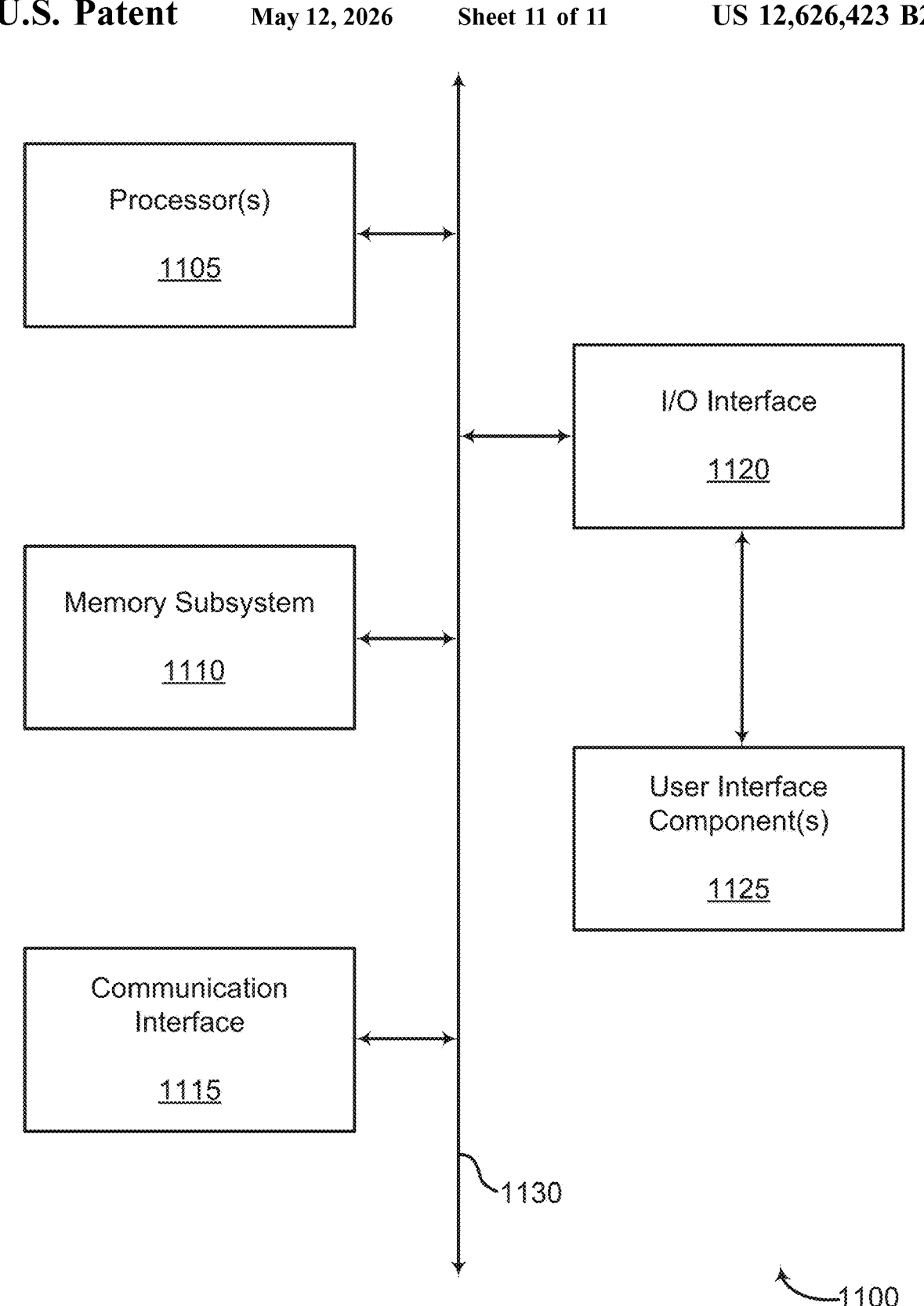
FIG. 11 shows an example of a computing device according to aspects of the present disclosure.

FIG. 11 shows an example of a computing device 1100 according to aspects of the present disclosure. The example shown includes computing device 1100, processor(s) 1105, memory subsystem 1110, communication interface 1115, I/O interface 1120, user interface component(s) 1125, and channel 1130.

In some embodiments, computing device 1100 is an example of, or includes aspects of, image generation apparatus 100 of FIG. 1. In some embodiments, computing device 1100 includes one or more processors 1105 are configured to execute instructions stored in memory subsystem 1110 to obtain a prompt describing a scene, wherein the prompt includes scene text; encode, using a prompt encoder, the prompt to generate a prompt embedding; encode, using a character-level encoder, the scene text to generate a character-level embedding; and generate, using an image generation network, an image that includes the scene text based on the prompt embedding and the character-level embedding.

According to some aspects, computing device 1100 includes one or more processors 1105. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1110 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. The memory may store various parameters of machine learning models used in the components described with reference to FIG. 2. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1115 operates at a boundary between communicating entities (such as computing device 1100, one or more user devices, a cloud, and one or more databases) and channel 1130 and can record and process communications. In some cases, communication interface 1115 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1120 is controlled by an I/O controller to manage input and output signals for computing device 1100. In some cases, I/O interface 1120 manages peripherals not integrated into computing device 1100. In some cases, I/O interface 1120 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1120 or via hardware components controlled by the I/O controller.

According to some aspects, user interface component(s) 1125 enable a user to interact with computing device 1100. In some cases, user interface component(s) 1125 include an audio device, such as an external speaker system, an external display device such as a display screen, an input device (e.g., a remote control device interfaced with a user interface directly or through the I/O controller), or a combination thereof. In some cases, user interface component(s) 1125 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an image having an initial aspect ratio and depicting a scene element;

identifying, using an aspect ratio selection element, a target aspect ratio different from the initial aspect ratio from among a plurality of candidate aspect ratios corresponding to a fixed set of output aspect ratios of a generative neural network;

positioning the image in an image frame having the target aspect ratio, wherein the image frame includes an image region containing the image and one or more extended regions outside the boundaries of the image;

automatically creating a mask based on the target aspect ratio and the positioning of the image, wherein the mask indicates the one or more extended regions; and generating, using the generative neural network, an extended image having the target aspect ratio based on the image and the mask, wherein the extended image depicts the image in the image region and one or more generated image portions in the one or more extended regions, respectively, and wherein the one or more generated image portions comprise an extension of the scene element depicted in the image.

2. The method of claim 1, further comprising:

providing the plurality of candidate aspect ratios to a user; and receiving an aspect ratio input from the user, wherein the target aspect ratio is identified from the plurality of candidate aspect ratios based on the aspect ratio input.

3. The method of claim 1, further comprising:

receiving a positioning input from a user, wherein the image is positioned in the image frame based on the positioning input.

4. The method of claim 3, wherein the extended image has a same dimension as the image and a different dimension than the image.

5. The method of claim 1, further comprising:

dilating the image to obtain a dilated image, wherein the dilated image is positioned in the image frame, and wherein the extended image is based on the dilated image.

6. The method of claim 1, further comprising:

receiving a text prompt, wherein the extended image is generated based on the text prompt.

7. The method of claim 1, further comprising:

receiving an image prompt depicting an object, wherein the extended image includes the object in the one or more extended regions.

8. The method of claim 1, wherein:

the extended image is generated to include a plurality of generated image portions on multiple sides of the image, respectively, using a one-click process.

9. An apparatus for image processing, comprising:

at least one processor unit; and at least one memory unit storing instructions and in electronic communication with the at least one processor unit;

an aspect ratio selection element configured to identify a target aspect ratio different from an initial aspect ratio of an image from among a plurality of candidate aspect ratios corresponding to a fixed set of output aspect ratios of a generative neural network;

an image framing component configured to position the image in an image frame having the target aspect ratio, wherein the image frame includes an image region containing the image and one or more extended regions outside the boundaries of the image;

a mask generation component configured to create a mask based on the target aspect ratio and the position of the image in the image frame, wherein the mask indicates the one or more extended regions; and the generative neural network comprising parameters stored in the at least one memory unit and trained to generate an extended image based on the image, the mask, and the image frame, wherein the extended image includes the image in the image region and one or more generated image portions in the one or more extended regions, respectively.

10. The apparatus of claim 9, the at least one memory unit further including instructions to:

provide the plurality of candidate aspect ratios to a user; and receive an aspect ratio input from the user, wherein the target aspect ratio is identified from the plurality of candidate aspect ratios based on the aspect ratio input.

11. The apparatus of claim 10, the at least one memory unit further including instructions to:

receive a positioning input from the user, wherein the image is positioned in the image frame based on the positioning input.

12. The apparatus of claim 11, wherein:

the extended image has a same dimension as the image and a different dimension than the image.

13. The apparatus of claim 9, the at least one memory unit further including instructions to:

dilate the image to obtain a dilated image, wherein the dilated image is positioned in the image frame, and wherein the extended image is based on the dilated image.

14. The apparatus of claim 9, the at least one memory unit further including instructions to:

receive a text prompt, wherein the extended image is generated based on the text prompt.

15. The apparatus of claim 14, wherein:

the one or more generated image portions of the extended image are generated based on the text prompt.

16. The apparatus of claim 9, the at least one memory unit further including instructions to receive an image prompt depicting an object, wherein the extended image includes the object in the one or more extended regions.

17. A method comprising:

providing a user interface including an aspect ratio selection element;

receiving an aspect ratio input via the user interface, wherein the aspect ratio input indicates a target aspect ratio from among a plurality of candidate aspect ratios corresponding to a fixed set of output aspect ratios of a generative neural network;

positioning an image in an image frame having the target aspect ratio, wherein the image frame includes an image region containing the image and one or more extended regions outside the boundaries of the image;

automatically creating a mask based on the target aspect ratio and the positioning of the image, wherein the mask indicates the one or more extended regions;

generating an extended image using the generative neural network based on the mask, wherein the extended image includes the image in the image region and one or more generated image portions in the one or more extended regions, respectively; and displaying the extended image via the user interface in response to the received aspect ratio input.

18. The method of claim 17, wherein:

the extended image is generated to include a plurality of generated image portions on multiple sides of the image based on a one-click input of the aspect ratio input.

19. The method of claim 17, further comprising:

providing the plurality of candidate aspect ratios to a user via the aspect ratio selection element as preview images including the one or more extended regions to be generated, wherein the plurality of candidate aspect ratios comprises the aspect ratio input.

20. The method of claim 17, further comprising:

receiving a positioning input via the user interface, wherein the image is positioned in the image frame based on the positioning input.

\* \* \* \* \*